(12) United States Patent
Wiley et al.

(10) Patent No.: US 7,315,265 B2
(45) Date of Patent: Jan. 1, 2008

(54) DOUBLE DATA RATE SERIAL ENCODER

(75) Inventors: George Alan Wiley, San Diego, CA (US); Brian Steele, Lafayette, CO (US); Curtis D. Musfeldt, Boulder, CO (US)

(73) Assignee: Qualcomm Incorporated, San Diego, CA (US)

( * ) Notice: Subject to any disclaimer, the term of this patent is extended or adjusted under 35 U.S.C. 154(b) by 6 days.

(21) Appl. No.: 11/285,397

(22) Filed: Nov. 23, 2005

(65) Prior Publication Data

US 2006/0179384 A1   Aug. 10, 2006

Related U.S. Application Data

(60) Provisional application No. 60/631,549, filed on Nov. 30, 2004, provisional application No. 60/630,853, filed on Nov. 24, 2004, provisional application No. 60/632,852, filed on Dec. 2, 2004, provisional application No. 60/632,825, filed on Dec. 2, 2004, provisional application No. 60/633,084, filed on Dec. 2, 2004, provisional application No. 60/633,071, filed on Dec. 2, 2004.

(51) Int. Cl.
    *H03M 9/00* (2006.01)
(52) U.S. Cl. ........................ 341/100; 341/141
(58) Field of Classification Search ............ 341/141, 341/100; 326/39, 53, 41
    See application file for complete search history.

(56) References Cited

U.S. PATENT DOCUMENTS

| 5,418,452 | A | * | 5/1995 | Pyle ........................ 324/158.1 |
| 5,490,247 | A | | 2/1996 | Tung et al. |
| 5,559,459 | A | * | 9/1996 | Back et al. .................. 326/93 |
| 5,575,951 | A | | 11/1996 | Anderson |
| 5,818,255 | A | * | 10/1998 | New et al. .................... 326/39 |
| 5,867,501 | A | | 2/1999 | Horst et al. |
| 6,064,649 | A | | 5/2000 | Johnston |
| 6,154,156 | A | * | 11/2000 | Tagato ........................ 341/79 |

(Continued)

FOREIGN PATENT DOCUMENTS

WO         96/42158 A1    12/1996

(Continued)

OTHER PUBLICATIONS

Video Electronics Standards Association (VESA), "Mobile Display Digital Interface Standard (MDDI)", Jul. 2004.

(Continued)

*Primary Examiner*—Linh Nguyen
(74) *Attorney, Agent, or Firm*—Sterne, Kessler, Goldstein & F. . .; Richard A. Bachand; Thomas Rouse (57) ABSTRACT

A double data rate serial encoder is provided. The serial encoder comprises a mux having a plurality of inputs, a plurality of latches coupled to the inputs of the mux, an enabler to enable the latches to update their data inputs, and a counter to select one of the plurality of inputs of the mux for output. In another aspect, the mux provides a glitch-less output during input transitions. The mux includes an output selection algorithm optimized based on a priori knowledge of an input selection sequence provided by the counter.

19 Claims, 10 Drawing Sheets

U.S. PATENT DOCUMENTS

| | | | |
|---|---|---|---|
| 6,222,677 B1 | 4/2001 | Budd et al. | |
| 6,243,596 B1 | 6/2001 | Kikinis | |
| 6,397,286 B1 | 5/2002 | Chatenever et al. | |
| 6,493,713 B1* | 12/2002 | Kanno | 707/6 |
| 6,594,304 B2 | 7/2003 | Chan | |
| 6,611,221 B1* | 8/2003 | Soundarapandian et al. | 341/143 |
| 6,760,722 B1 | 7/2004 | Raghunandan | |
| 6,760,772 B2* | 7/2004 | Zou et al. | 709/230 |
| 7,003,796 B1* | 2/2006 | Humpleman | 725/151 |
| 2003/0033417 A1 | 2/2003 | Zou et al. | |
| 2004/0073697 A1 | 4/2004 | Saito et al. | |
| 2004/0130466 A1* | 7/2004 | Lu | 341/50 |
| 2004/0140459 A1 | 7/2004 | Haigh et al. | |
| 2005/0165970 A1 | 7/2005 | Ching et al. | |
| 2005/0216421 A1 | 9/2005 | Barry et al. | |
| 2005/0248685 A1 | 11/2005 | Seo et al. | |
| 2006/0179384 A1* | 8/2006 | Wiley et al. | 714/741 |

FOREIGN PATENT DOCUMENTS

| | | |
|---|---|---|
| WO | 98/02988 A2 | 1/1998 |
| WO | 0249314 A1 | 6/2002 |
| WO | 03023587 A2 | 3/2003 |

OTHER PUBLICATIONS

Plug and Display Standard, Video Electronics Standards Association (VESA) San Jose, CA (Jun. 11, 1997).

* cited by examiner

Mux output for particular counter input selection value

| Input | $S_2 S_1 S_0$ |
|-------|---------------|
| D0 | 001 |
| D1 | 011 |
| D2 | 010 |
| D3 | 110 |
| D4 | 111 |
| D5 | 101 |
| D6 | 100 |
| D7 | 000 |

DOUBLE DATA RATE SERIAL ENCODER

CROSS REFERENCE TO RELATED APPLICATIONS

The present application claims priority to Provisional Application No. 60/630,853 entitled "MDDI Host Core Design" filed Nov. 24, 2004, Provisional Application No. 60/631,549 entitled "Mobile Display Digital Interface Host Camera Interface Device" filed Nov. 30, 2004, Provisional Application No. 60/632,825 entitled "Camera MDDI Host Device" filed Dec. 2, 2004, Provisional Application No. 60/633,071 entitled "MDDI Overview" filed Dec. 2, 2004, Provisional Application No. 60/633,084 entitled "MDDI Host Core Pad Design" filed Dec. 2, 2004, and Provisional Application No. 60/632,852 entitled "Implementation of the MDDI Host Controller" filed Dec. 2, 2004, and assigned to the assignee hereof and hereby expressly incorporated by reference herein in their entirety.

The present application is also related to commonly assigned U.S. Pat. No. 6,760,772 B2, titled "Generating and Implementing a Communication Protocol and Interface for High Speed Data Transfer", issued Jul. 6, 2004, the disclosure of which is incorporated herein by reference.

BACKGROUND

1. Field

The present invention relates generally to a serial encoder for high data rate serial communication links. More particularly, the invention relates to a double data rate serial encoder for Mobile Display Digital Interface (MDDI) links.

2. Background

In the field of interconnect technologies, demand for ever increasing data rates, especially as related to video presentations, continues to grow.

The Mobile Display Digital Interface (MDDI) is a cost-effective, low power consumption, transfer mechanism that enables very-high-speed data transfer over a short-range communication link between a host and a client. MDDI requires a minimum of just four wires plus power for bidirectional data transfer that delivers a maximum bandwidth of up to 3.2 Gbits per second.

In one application, MDDI increases reliability and decreases power consumption in clamshell phones by significantly reducing the number of wires that run across a handset's hinge to interconnect the digital baseband controller with an LCD display and/or a camera. This reduction of wires also allows handset manufacturers to lower development costs by simplifying clamshell or sliding handset designs.

MDDI is a serial transfer protocol, and, as such, data received in parallel for transmission over an MDDI link needs to be serialized. What is needed therefore is a serial encoder, integrable in an MDDI link controller, that supports the high-speed data rate of MDDI.

SUMMARY

In one aspect of the present invention, a double data rate serial encoder for MDDI is provided. The serial encoder comprises a multiplexer (mux) having a plurality of inputs, a plurality of latches coupled to the inputs of the mux, an enabler to enable the latches to update their data inputs, and a counter to select one of the plurality of inputs of the mux for output.

In another aspect of the invention, the mux provides a glitch-less output during input transitions. The mux may include an output selection algorithm optimized based on a priori knowledge of an input selection sequence provided by the counter. The input selection sequence may be Gray code sequence.

Further embodiments, features, and advantages of the present invention, as well as the structure and operation of the various embodiments of the present invention, are described in detail below with reference to the accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Mobile Display Digital Interface (MDDI)

The Mobile Display Digital Interface (MDDI) is a cost-effective, low power consumption, transfer mechanism that enables very-high-speed serial data transfer over a short-range communication link between a host and a client.

In the following, examples of MDDI will be presented with respect to a camera module contained in an upper clamshell of a mobile phone. However, it would be apparent to persons skilled in the relevant art(s) that any module having functionally equivalent features to the camera module could be readily substituted and used in embodiments of this invention.

Further, according to embodiments of the invention, an MDDI host may comprise one of several types of devices that can benefit from using the present invention. For example, the host could be a portable computer in the form of a handheld, laptop, or similar mobile computing device. It could also be a Personal Data Assistant (PDA), a paging device, or one of many wireless telephones or modems.

Alternatively, the host could be a portable entertainment or presentation device such as a portable DVD or CD player, or a game playing device. Furthermore, the host can reside as a host device or control element in a variety of other widely used or planned commercial products for which a high speed communication link is desired with a client. For example, a host could be used to transfer data at high rates from a video recording device to a storage based client for improved response, or to a high resolution larger screen for presentations. An appliance such as a refrigerator that incorporates an onboard inventory or computing system and/or Bluetooth connections to other household devices, can have improved display capabilities when operating in an internet or Bluetooth connected mode, or have reduced wiring needs for in-the-door displays (a client) and keypads or scanners (client) while the electronic computer or control systems (host) reside elsewhere in the cabinet. In general, those skilled in the art will appreciate the wide variety of modern electronic devices and appliances that may benefit from the use of this interface, as well as the ability to retrofit older devices with higher data rate transport of information utilizing limited numbers of conductors available in either newly added or existing connectors or cables. At the same time, an MDDI client may comprise a variety of devices useful for presenting information to an end user, or presenting information from a user to the host. For example, a micro-display incorporated in goggles or glasses, a projection device built into a hat or helmet, a small screen or even holographic element built into a vehicle, such as in a window or windshield, or various speaker, headphone, or sound systems for presenting high quality sound or music. Other presentation devices include projectors or projection devices used to present information for meetings, or for movies and television images. Another example would be the use of touch pads or sensitive devices, voice recognition input devices, security scanners, and so forth that may be called upon to transfer a significant amount of information from a device or system user with little actual "input" other than touch or sound from the user. In addition, docking stations for computers and car kits or desk-top kits and holders for wireless telephones may act as interface devices to end users or to other devices and equipment, and employ either clients (output or input devices such as mice) or hosts to assist in the transfer of data, especially where high speed networks are involved. However, those skilled in the art will readily recognize that the present invention is not limited to these devices, there being many other devices on the market, and proposed for use, that are intended to provide end users with high quality images and sound, either in terms of storage and transport or in terms of presentation at playback. The present invention is useful in increasing the data throughput between various elements or devices to accommodate the high data rates needed for realizing the desired user experience.

Figure 1:
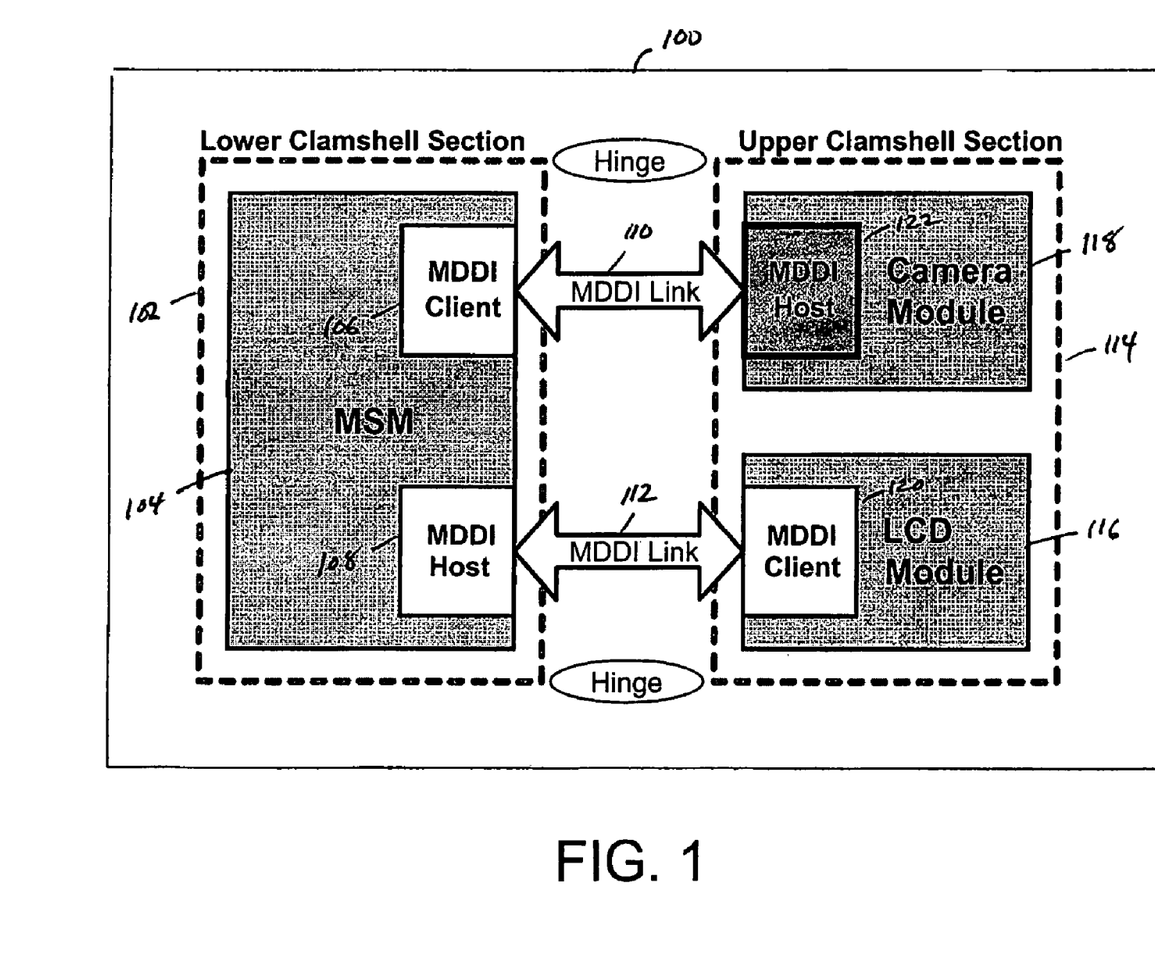
FIG. 1 is a block diagram that illustrates an example environment using a Mobile Display Digital Interface (MDDI) interface.
Figure 1A:
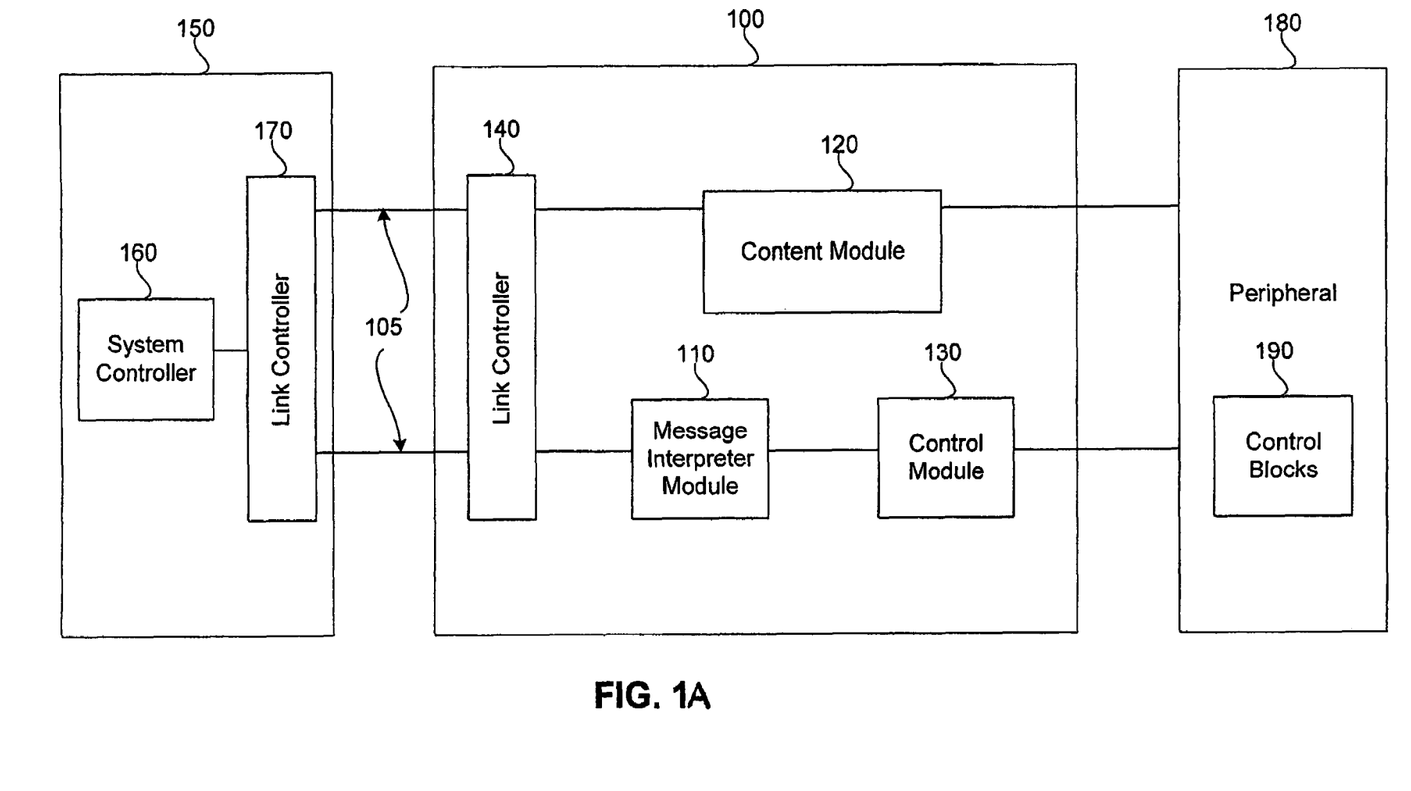
FIG. 1A is a diagram of a digital data device interface coupled to a digital device and a peripheral device.

FIG. 1A is a diagram of a digital data device interface 100 coupled to a digital device 150 and a peripheral device 180. Digital device 150 can include, but is not limited to, a cellular telephone, a personal data assistant, a smart phone or a personal computer. In general digital device 150 can include any type of digital device that serves as a processing unit for digital instructions and the processing of digital presentation data. Digital device 150 includes a system controller 160 and a link controller 170.

Peripheral device 180 can include, but is not limited to, a camera, a bar code reader, an image scanner, an audio device, and a sensor. In general peripheral 180 can include any type of audio, video or image capture and display device in which digital presentation data is exchanged between a peripheral and a processing unit. Peripheral 180 includes control blocks 190. When peripheral 180 is a camera, for example, control blocks 190 can include, but are not limited to lens control, flash or white LED control and shutter control. Digital presentation data can include digital data representing audio, image and multimedia data.

Digital data interface device 100 transfers digital presentation data at a high rate over a communication link 105. In one example, an MDDI communication link can be used which supports bi-directional data transfer with a maximum bandwidth of 3.2 Gbits per second. Other high rates of data transfer that are higher or lower than this example rate can be supported depending on the communications link. Digital data interface device 100 includes a message interpreter module 110, a content module 120, a control module 130 and a link controller 140.

Link controller 140, which is located within digital data interface 100, and link controller 170, which is located within digital device 150 establish communication link 105. Link controller 140 and link controller 170 may be MDDI link controllers.

The Video Electronics Standards Association ("VESA") MDDI Standard, which is incorporated herein by reference in its entirety, describes the requirements of a high-speed digital packet interface that lets portable devices transport digital images from small portable devices to larger external displays. MDDI applies a miniature connector system and thin flexible cable ideal for linking portable computing, communications and entertainment devices to emerging products such as wearable micro displays. It also includes information on how to simplify connections between host processors and a display device, in order to reduce the cost and increase the reliability of these connections. Link controllers 140 and 170 establish communication path 105 based on the VESA MDDI Standard.

U.S. Pat. No. 6,760,772, entitled Generating and Implementing a Communication Protocol and Interface for High Data Rate Signal Transfer, issued to Zou et al. on Jul. 6, 2004 ('772 Patent") describes a data interface for transferring digital data between a host and a client over a communication path using packet structures linked together to form a communication protocol for presentation data. Embodiments of the invention taught in the '772 Patent are directed to an MDDI interface. The signal protocol is used by link controllers, such as link controllers 140 and 170, configured to generate, transmit, and receive packets forming the communications protocol, and to form digital data into one or more types of data packets, with at least one residing in the host device and being coupled to the client through a communications path, such as communications path 105.

The interface provides a cost-effective, low power, bi-directional, high-speed data transfer mechanism over a short-range "serial" type data link, which lends itself to implementation with miniature connectors and thin flexible cables. An embodiment of link controllers 140 and 170 establishes communication path 105 based on the teachings of the '772 Patent. The '772 Patent is herein incorporated by reference in its entirety.

In other embodiments, link controllers 140 and 170 can both be a USB link controller or they both can include a combination of controllers, such as for example, an MDDI link controller and another type of link controller, such as, for example, a USB link controller. Alternatively, link controllers 140 and 170 can include a combination of controllers, such as an MDDI link controller and a single link for exchanging acknowledgement messages between digital data interface device 100 and digital device 150. Link controllers 140 and 170 additionally can support other types of interfaces, such as an Ethernet or RS-232 serial port interface. Additional interfaces can be supported as will be known by individuals skilled in the relevant arts based on the teachings herein.

Within digital data interface device 100, message interpreter module 110 receives commands from and generates response messages through communication link 105 to system controller 160, interprets the command messages, and routes the information content of the commands to an appropriate module within digital data interface device 100.

Content module 120 receives data from peripheral device 180, stores the data and transfers the data to system controller 160 through communication link 105.

Control module 130 receives information from message interpreter 130, and routes information to control blocks 190 of peripheral device 180. Control module 130 can also receive information from control blocks 190 and routes the information to the message interpreter module 110.

FIG. 1 is a block diagram that illustrates an example environment using an MDDI interface. In the example of FIG. 1, MDDI is used to interconnect modules across the hinge of a clamshell phone 100. It must be noted here that while certain embodiments of the present invention will be described in the context of specific examples, such as MDDI interconnections in a clamshell phone, this is done for illustration purposes only and should not be used to limit the present invention to such embodiments. As will be understood by a person skilled in the relevant art(s) based on the teachings herein, embodiments of the present invention may be used in other devices including any that may benefit from having MDDI interconnections.

Referring to FIG. 1, a lower clamshell section 102 of clamshell phone 100 includes a Mobile Station Modem (MSM) baseband chip 104. MSM 104 is a digital baseband controller. An upper clamshell section 114 of clamshell phone 100 includes a Liquid Crystal Display (LCD) module 116 and a camera module 118.

Still referring to FIG. 1, an MDDI link 110 connects camera module 118 to MSM 104. Typically, an MDDI link controller is integrated into each of camera module 118 and MSM 104. In the example of FIG. 1, an MDDI Host 122 is integrated into camera module 112, while an MDDI Client 106 resides on the MSM side of the MDDI link 110. Typically, the MDDI host is the master controller of the MDDI link. In the example of FIG. 1, pixel data from camera module 118 are received and formatted into MDDI packets by MDDI Host 122 before being transmitted onto MDDI link 110. MDDI client 106 receives the MDDI packets and re-converts them into pixel data of the same format as generated by camera module 118. The pixel data are then sent to an appropriate block in MSM 104 for processing.

Still referring to FIG. 1, an MDDI link 112 connects LCD module 116 to MSM 104. In the example of FIG. 1, MDDI link 112 interconnects an MDDI Host 108, integrated into MSM 104, and an MDDI Client 120 integrated into LCD module 116. In the example of FIG. 1, display data generated by a graphics controller of MSM 104 are received and formatted into MDDI packets by MDDI Host 108 before being transmitted onto MDDI link 112. MDDI client 120 receives the MDDI packets and re-converts them into display data for use by LCD module 116.

Figure 2:
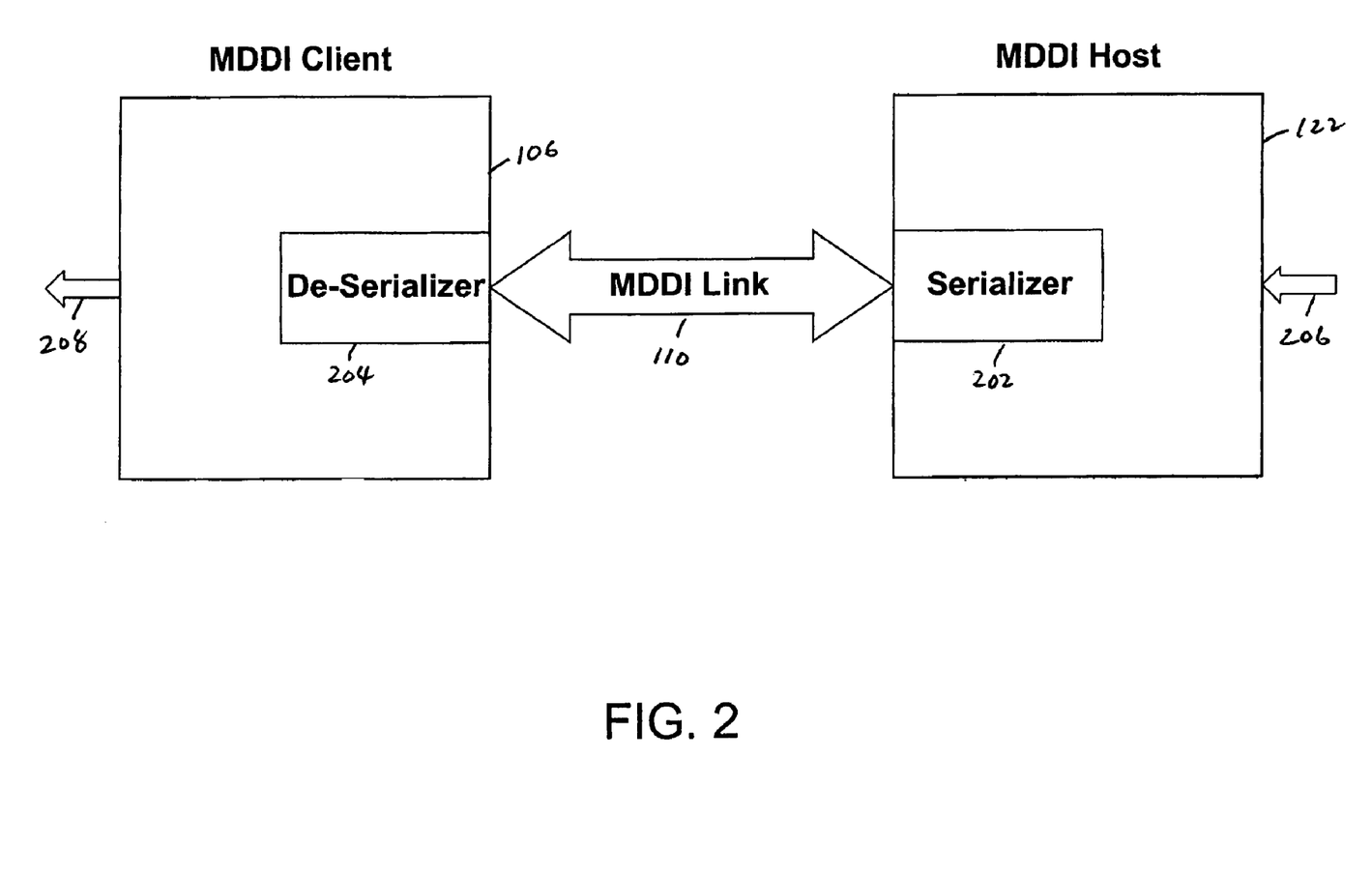
FIG. 2 is a block diagram that illustrates an MDDI link interconnection according to an embodiment of the example of FIG. 1.

FIG. 2 is a block diagram that illustrates MDDI link interconnection 110 according to the example of FIG. 1. As described above, one of the functions of MDDI link 110 is to transfer pixel data from camera module 118 to MSM 104. Accordingly, in the embodiment of FIG. 2, a frame interface 206 connects camera module 118 to MDDI Host 122. The frame interface 206 serves to transfer pixel data from camera module 118 to MDDI Host 122.

Typically, camera module 118 receives pixel data from a camera through a parallel interface, stores the pixel data, and then transfers it to MDDI Host 122 when the host is ready. MDDI Host 122 encapsulates the received pixel data into MDDI packets. However, in order for MDDI Host 122 be able to transmit the pixel data onto MDDI link 110, a serialization of the MDDI packets is necessary.

In the embodiment of FIG. 2, a serializer module 202, integrated within MDDI Host 122, serves to serially shift out the MDDI packets onto MDDI link 110. At the MSM end of MDDI link 110, a de-serializer module 204, integrated within MDDI client 106, re-constructs the MDDI packets from the serial data received over MDDI link 110. MDDI client 106 then removes the MDDI encapsulation and transfers the parallel pixel data through a frame interface 208 to an appropriate block of MSM 104.

MDDI Host Core Architecture

The MDDI Host core provides a hardware implementation of the host side of the MDDI Specification as defined by the VESA (Video Electronics Standards Association). The MDDI Host core interfaces with both an MDDI Host processor and with an external connection operating as specified in the MDDI Specification.

Figure 3:
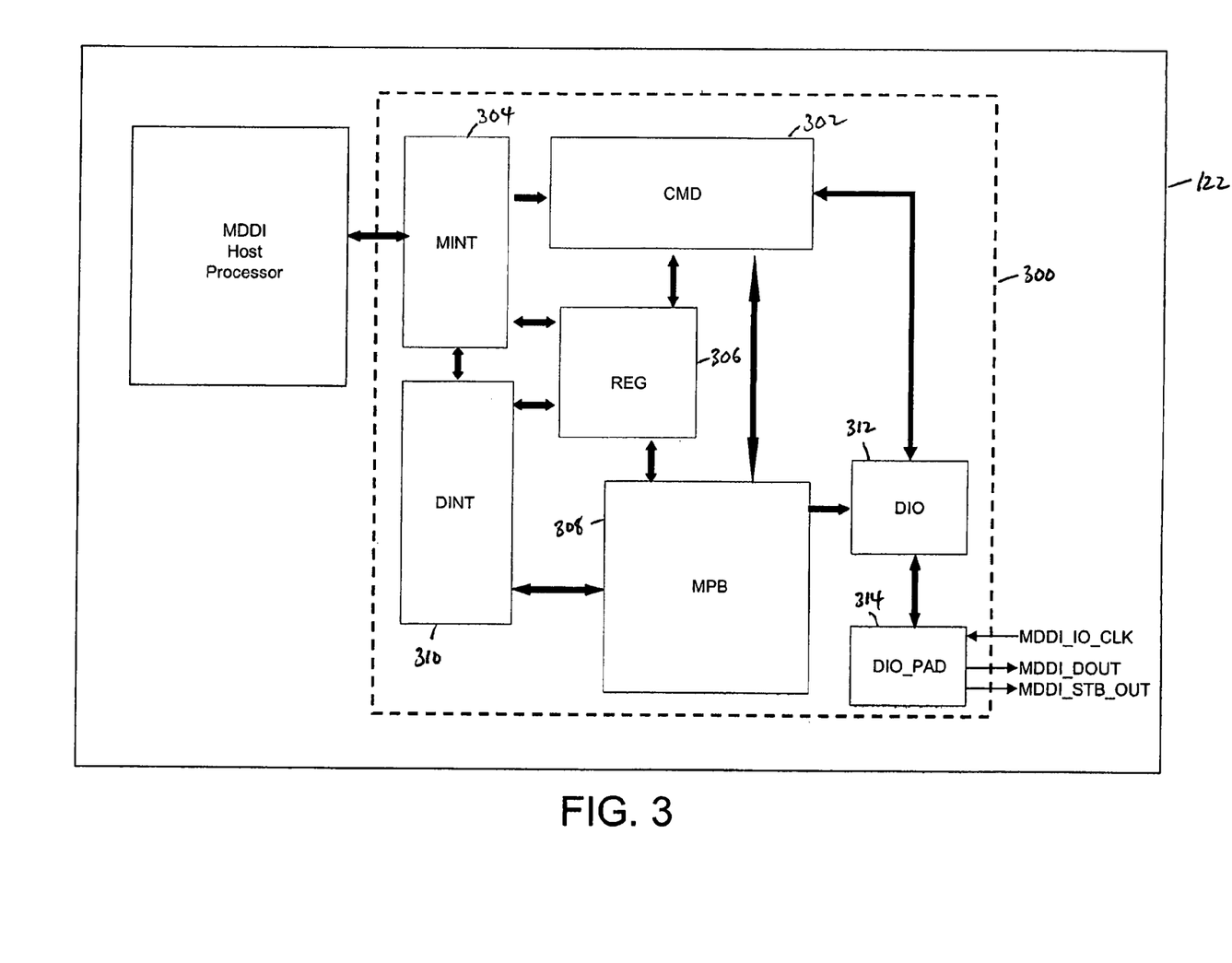
FIG. 3 is a block diagram that illustrates the internal architecture of the MDDI Host Core of the MDDI Host of FIG. 1.

FIG. 3 is a block diagram that illustrates the internal architecture of MDDI Host Core 300 of MDDI Host 122. MDDI Host Core 300 includes a Command Processor (CMD) block 302, a Microprocessor Interface (MINT) block 304, a Registers (REG) block 306, an MDDI Packet Builder (MPB) block 308, a Direct Access Memory (DMA) Interface (DINT) block 310, a Data Input/Output (DIO) block 312, and a DIO Pad block 314. The function of each block of MDDI Host Core 300 will now be described with reference to FIG. 3.

CMD block 302 is responsible for processing commands issued by the MDDI Host 122 processor. Commands issued by the host processor include tasks such as powering up/down the MDDI link and generating certain MDDI packets.

MINT block 304 is responsible for interfacing with the MDDI Host processor. The MDDI Host processor uses MINT block 304 to set registers, read registers, and issue commands to MDDI Host core 300. MINT block 304 passes processor commands to CMD block 302 and register read/write commands to REG block 306.

REG block 306 stores various registers necessary for the transmission of data across the MDDI link. Registers of REG block 306 control the behavior of the MDDI link as well as the configuration of MDDI Host core 300.

MPB block 308 is responsible for creating the MDDI packets to be transmitted over the MDDI link as well as determining the order of transmission. MDDI packets are created from internal register values, and data retrieved by DINT block 310.

DINT block 310 is responsible for interfacing with a DMA bus of MDDI Host 122. DINT block 310 issues burst requests to an external SDRAM memory of MDDI Host 122 to buffer data for MPB block 308. In addition, DINT block 310 assists MPB block 308 in determining the order of packet transmissions on the MDDI link.

DIO block 312 is responsible for managing the physical MDDI link. DIO block 312 is responsible for Host-Client handshaking, data output, and round trip delay measurements. DIO block 312 receives data from MPB block 308 and passes it out to DIO Pad block 314 block to be shifted out.

DIO Pad block 314 receives parallel data from DIO block 312 and serially shifts it out onto the MDDI link. In essence, DIO Pad block 314 is responsible for the data serialization required for transmission on the MDDI link. As shown in FIG. 3, DIO Pad block 314 receives an MDDI Input/Output clock signal (MDDI_IO_CLK) from the MDDI Host, and outputs MDDI Data Out (MDDI_DOUT) and MDDI Strobe Out (MDDI_STB_OUT) signals. In one example, DIO Pad block 314 shifts data out at twice the MDDI Input/Output clock rate.

Figure 4:
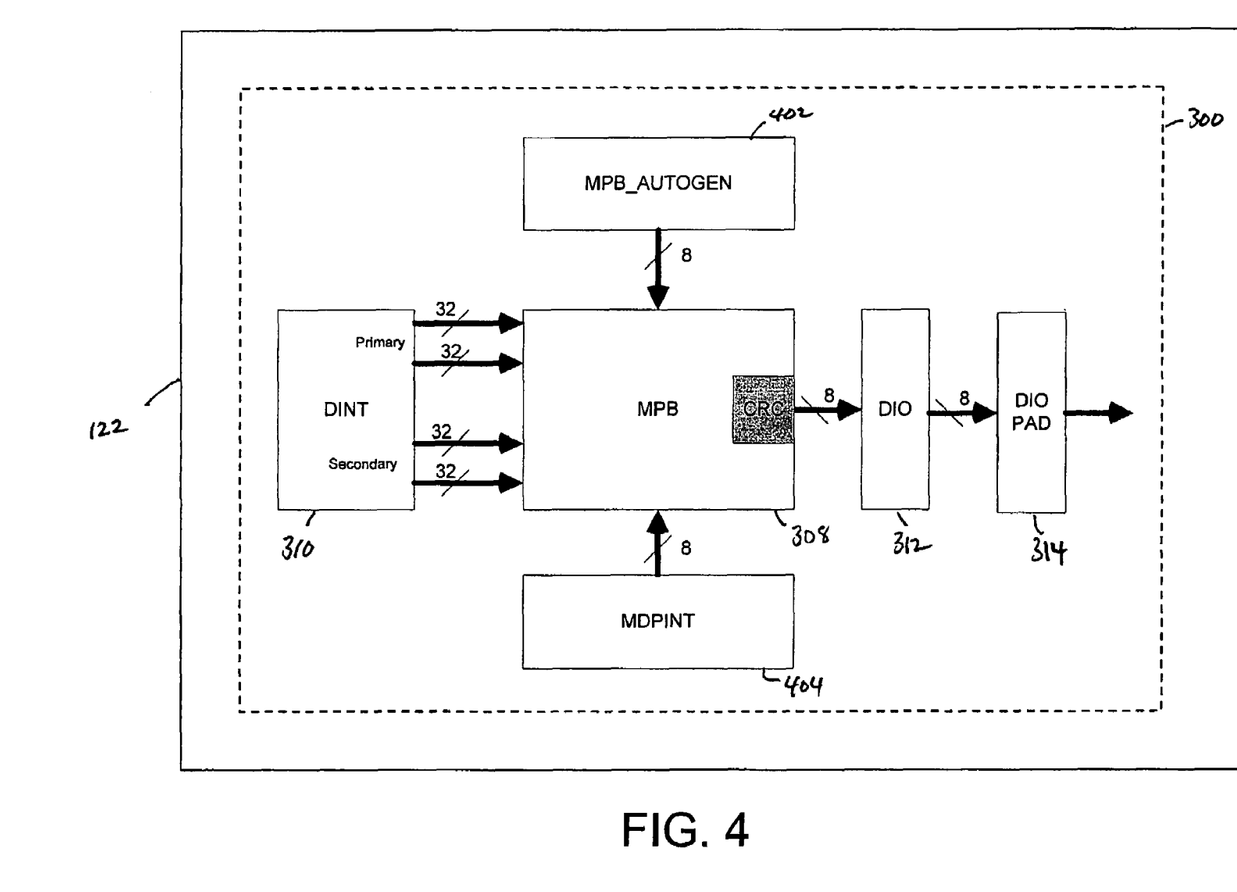
FIG. 4 is a block diagram that illustrates the data flow inside the MDDI Host Core of FIG. 3.

FIG. 4 is a block diagram that illustrates the data flow out of MDDI Host Core 300. For simplicity of illustration, certain blocks of MDDI Host Core 300 have been omitted.

Typically, at the MDDI link startup, the output data is entirely generated within DIO block 312 for Host-Client handshaking. Once the handshaking sequence is completed, MPB block 308 is allowed to direct the output flow of data which is received from three sources. An MPB_AUTOGEN block 402, a sub-block of the MPB block 308, generates packets internally within MPB block 308. Data from MPB_AUTOGEN block 402 is received on an 8-bit parallel bus. Such packets include, for example, filler packets, round trip delay measurements, and link shutdown packets.

DINT block 310 of MDDI Host core 300 routes to MPB block 308 packets received from an external SDRAM memory of MDDI Host 122. DINT block 310 uses four 32-bit parallel buses to route data to MPB block 308. An MDDI Data Packets (MDP) Interface (MDPINT) block 404, which is a sub-block of MPB block 308, interfaces with an MDP block outside of the MDDI Host core and typically receives video data packets for transmission. MDPINT block 404 interfaces with MPB block 308 using an 8-bit parallel bus.

MPB block 308 determines the order of transmission of packets received from DINT block 310, MPB_AUTOGEN block 402, and MDPINT block 404. MPB block 308 then directs data for transmission to DIO block 312 over an 8-bit parallel bus. In turn, DIO block 312 forwards the data, on an 8-bit parallel bus, to DIO Pad block 314. DIO Pad block 314 serializes the data received from DIO block 312 for transmission on the MDDI link. Embodiments of DIO Pad block 314 according to the present invention are further discussed below.

MDDI Serial Encoder

Figure 5:
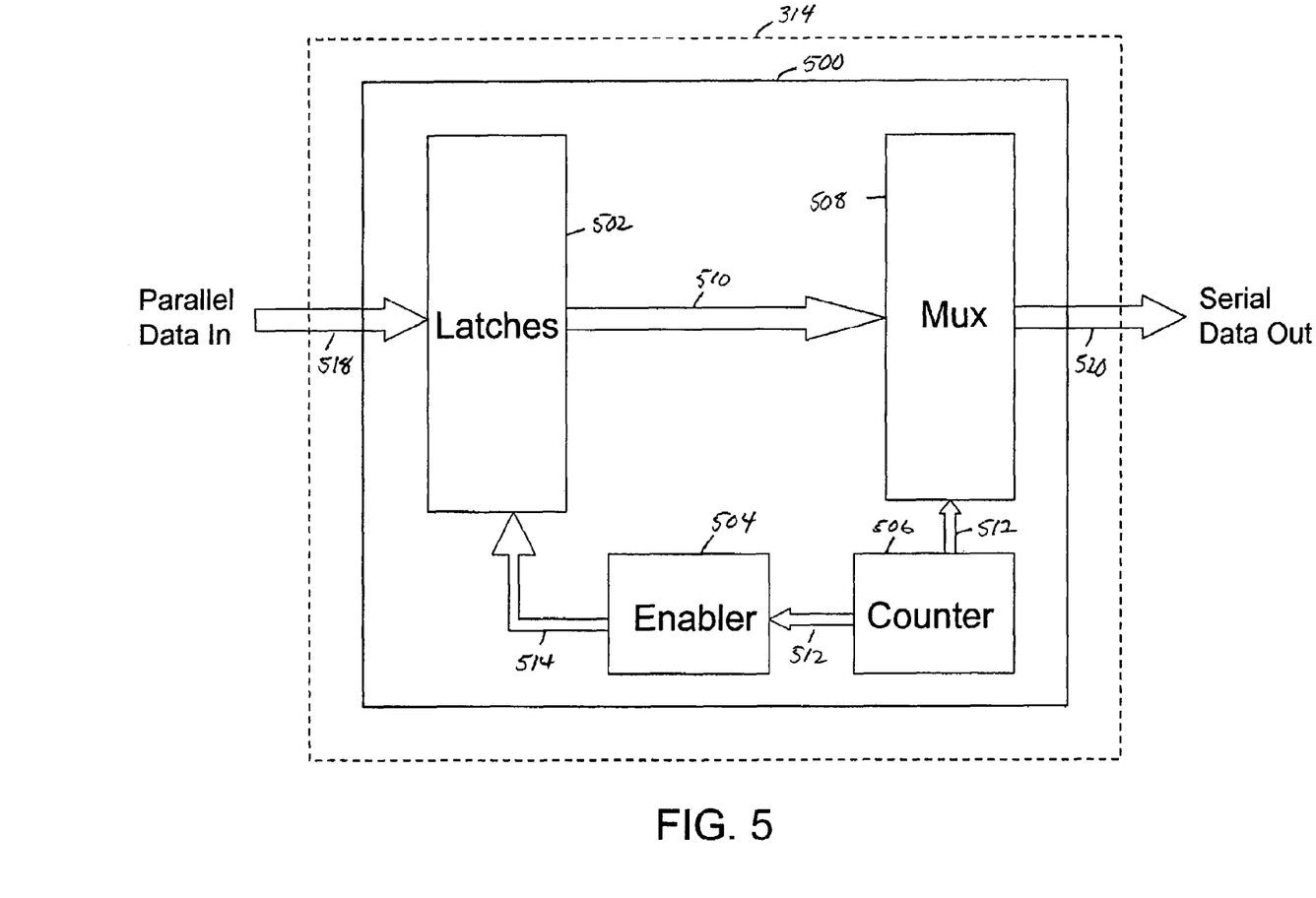
FIG. 5 is a block diagram that illustrates an MDDI serial encoder according to an embodiment of the present invention.

In essence, DIO Pad block 314 comprises a serial encoder for MDDI. FIG. 5 is a block diagram that illustrates an MDDI serial encoder 500 according to an embodiment of the present invention.

MDDI serial encoder 500 includes a block of latches 502, an enabler block 504, a counter block 506, and a mux 508. A parallel data interface provides a parallel data stream 518 to serial encoder 500. The parallel data stream is received and stored by latches 502. Counter 506 outputs an input selection sequence to control the output of mux 508. In the embodiment of FIG. 5, counter 506 provides mux 508 periodically with a set of select signals 512 to select the output of mux 508.

Using signals derived from the set of select signals 512, enabler 504 provides latches 502 with a set of signals 514 to enable them to update their data inputs. A set of signals 510 couple latches 502 to inputs of mux 508. Accordingly, the data inputs of latches 502 and the inputs of mux 508 are updated according to the input selection sequence generated by counter 506.

Mux 508 outputs a serial data stream 520 onto the MDDI link. In one example, mux 508 is an N:1 mux having N inputs and a single output, where N is an integer power of 2.

Figure 6:
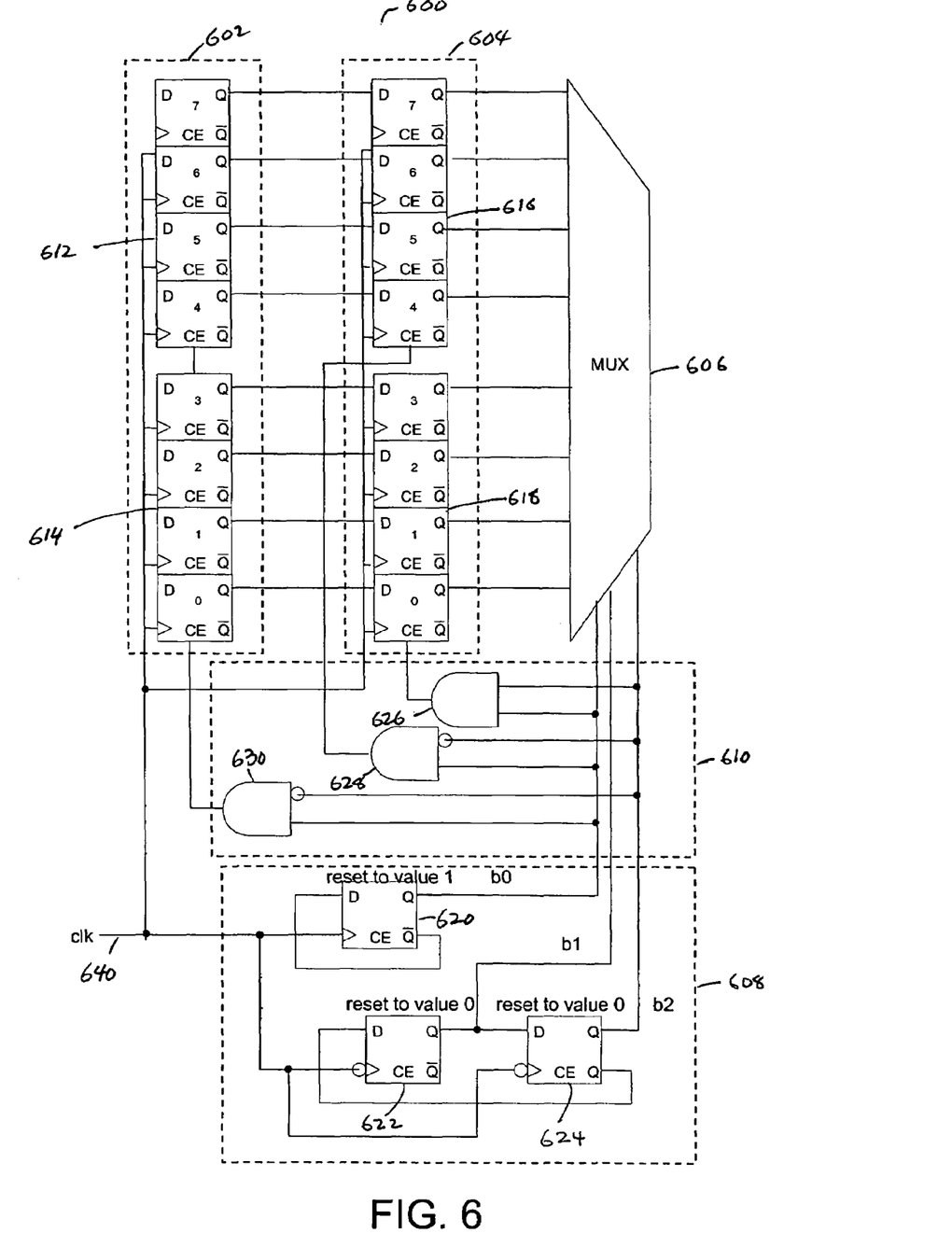
FIG. 6 is a circuit diagram that illustrates an MDDI serial encoder according to another embodiment of the present invention.

FIG. 6 is a circuit diagram that illustrates an MDDI serial encoder 600 according to another embodiment of the present invention. In the embodiment of FIG. 6, MDDI serial encoder 600 comprises a first layer of latches 602, a second layer of latches 604, a mux 606, a counter 608, and an enabler 610.

The first layer of latches 602 comprise first and second sets of latches 612 and 614. Similarly, the second layer of latches 604 comprise first and second sets of latches 616 and 618. First and second sets of latches 612 and 614 of the first layer of latches 602 are coupled, respectively, to first and second sets of latches 616 and 618 of the second layer of latches 604. Each set of latches 612, 614, 616, and 618 comprise a set of four D-latches. An input clock signal 640 is coupled to the clock input of each of the D-latches in the first and second layers of latches 602 and 604.

Mux 606 has a plurality of data inputs coupled to the outputs of the second layer of latches 604. Further, mux 606 comprises a set of select inputs being provided by counter 608. Typically, the mux has $2^N$ data inputs, where N is the number of select inputs. In the embodiment of FIG. 6, mux 606 has 8 data inputs and 3 select inputs b0, b1, and b2.

Counter 608 comprises a plurality of D-latches. In the embodiment of FIG. 6, counter 608 comprises a set of three D-latches 620, 622, and 624. Clock signal 640 provides an input to counter 608. The outputs of D-latches 620, 622, and 624 correspond, respectively, to select inputs b0, b1, and b2 of mux 606. Further, outputs of D-latches 620 and 624 are the inputs to enabler 610. Input clock signal 640 drives counter 608.

Enabler 610 comprises a plurality of AND gates. In the embodiment of FIG. 6, enabler 610 comprises three AND gates 626, 628, and 630. The inputs to AND gates 626, 628, and 630 are derived from the outputs of D-latches 620 and 624 of counter 608. The outputs of AND gates 626, 628, and 630 are coupled, respectively, to the second set of latches 618, the first set of latches 616, and the first and second sets of latches 612 and 614.

The operation of MDDI serial encoder 600 will now be described.

Assuming that serial encoder 600 has just been started, at the first rising edge of input clock signal 640, counter 608 outputs {b2, b1, b0}={0,0,1}. For this value of {b2, b1, b0}, the outputs of AND gates 628 and 630 of enabler 610 are true and, consequently, the inputs of the first and second sets of latches 612 and 614 of the first layer of latches 602 as well as the inputs of the first set of latches 616 of the second layer of latches 604 can be updated. Further, given that clock signal 640 is at a rising edge, the outputs of the first and second sets of latches 612 and 614 follow their corresponding inputs. Similarly, the outputs of the first set of latches 616 of the second layer of latches 604 also reflect their corresponding inputs. The inputs of the second set of latches 618 of the second layer of latches 604, however, remain unchanged. The mux 606 selects for output an input corresponding to the input selection value 001.

At the next falling edge of input clock signal 640, counter 608 outputs {b2, b1, b0}={0,1,1}. Given that {b2, b0}={0, 1}, the inputs of the first and second sets of latches 612 and 614 can be updated. However, since input clock signal 640 is at a falling edge, the outputs of latches 612 and 614 will not yet reflect the updated inputs. In other words, the outputs of latches 612 and 614 will remain the same. Consequently, the inputs of latches 616 will also remain the same. Mux 606 selects for output an input corresponding to the input selection value 011.

At the next two rising and falling edges of input clock signal 640, counter 608 outputs {b2, b1, b0}={0,1,0} and {b2, b1, b0}={1,1,0}, respectively. No changes occur at the inputs or outputs of either set of latches.

At the next rising edge of input clock signal 640, counter 608 outputs {b2, b1, b0}={1,1,1}. For {b2,b0}={1,1}, the output of AND gate 626 of enabler 610 is and, consequently, the inputs of the second set of latches 618 of the second layer of latches 604 are updated. Further, given that input clock 640 is at a rising edge, the outputs of latches 618 follow their corresponding inputs. Mux 606 selects for output an input corresponding to the input selection value 011.

For the next three rising and falling clock edges, the counter transitions through the sequence {b2,b1,b0}={101, 100, 000}. The inputs and outputs of all sets of latches 612, 614, 616, and 618 remain the same throughout these transitions. Subsequently, the input selection sequence returns to {b2,b1,b0}={0,0,1} and the cycle described above restarts.

According to the description above of the operation of MDDI serial encoder 600, it is noted that counter 608 transitions on either a rising or a falling edge of input clock signal 640 and that mux 606 outputs one bit at every edge of input clock signal 640. Accordingly, MDDI serial encoder 600 is a double data rate encoder. Further, the input selection sequence {b2,b1,b0} has a single bit only changing at every counter transition. Accordingly, the input selection sequence outputted by counter 608 represents a Gray code sequence.

Figure 7:
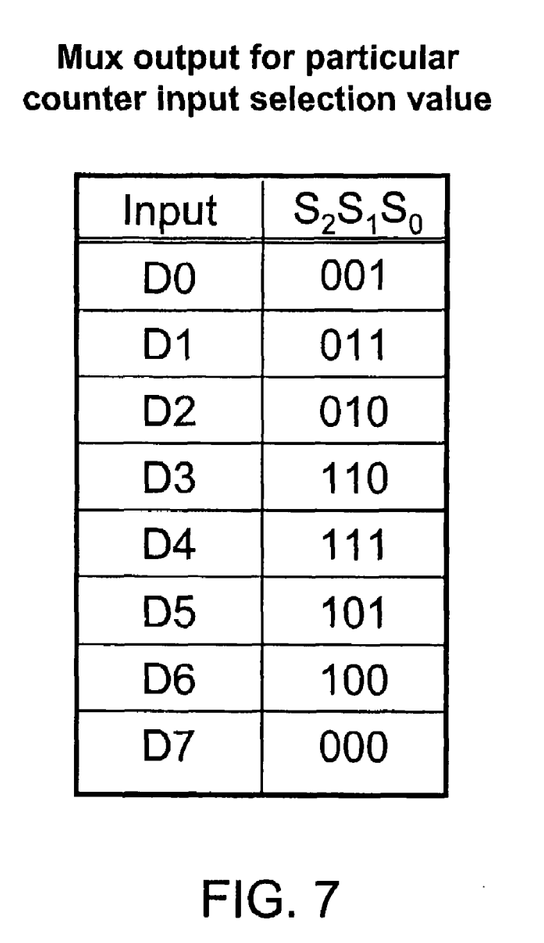
FIG. 7 illustrates a mux output selection algorithm in response to a Gray code input selection sequence.

FIG. 7 illustrates a mux output sequence in response to the Gray code input selection sequence of the embodiment of FIG. 6. According to the mux output sequence of FIG. 7, it is noted that mux 606 sequentially selects for output the inputs coupled to the second set of latches 618 during the first half of the input selection sequence and the inputs coupled to the first set of latches 616 during the second half of the input selection sequence.

Meanwhile, enabler 610 enables for update the first set of latches 616 during the first half of the input selection sequence and the second set of latches 618 during the second half of the input selection sequence. Accordingly, the first and second sets of latches 616 and 618 are updated when they are not being selected for output by the mux 606.

Glitch-Free Output

Figure 8:
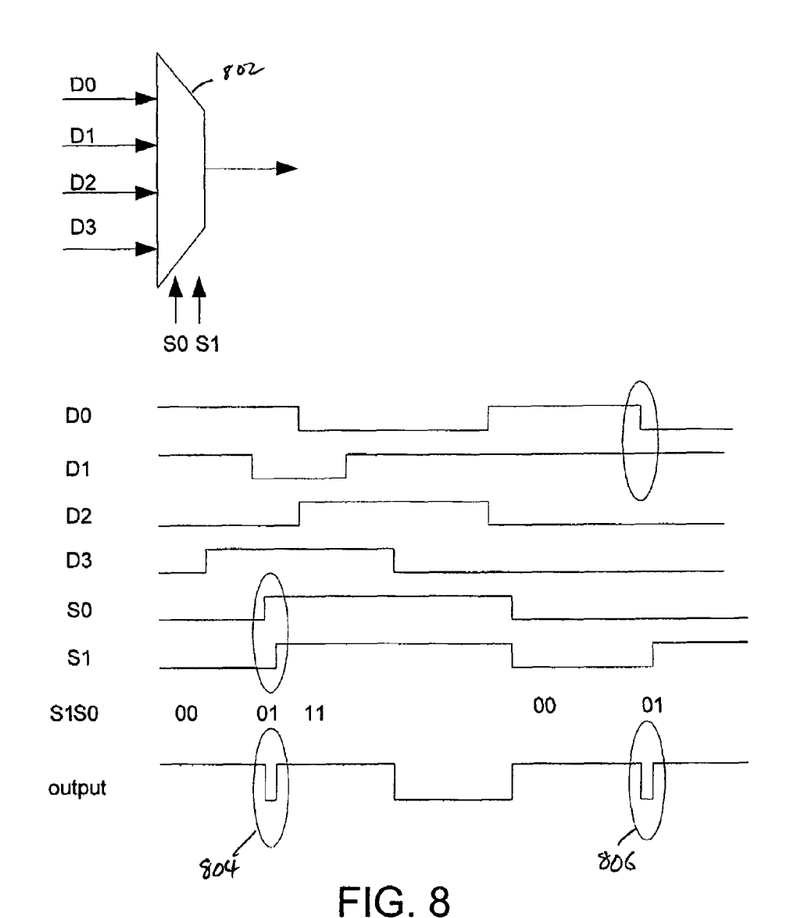
FIG. 8 is an example illustration of output glitches that can occur at the output of a mux due to select input transitions and data input transitions.

According to the present invention, mux 606 of MDDI serial encoder 600 provides a glitch-less output during input selection transitions. FIG. 8 is an example illustration of output glitches that can occur at the output of a mux due to transitions in the select inputs and/or the data inputs.

In the example of FIG. 8, a mux 802 has four data inputs D0, D1, D2, D3 and two select inputs S0 and S1. A first output glitch 804 is due to a transition in the select inputs of the mux. In the example, the input selection sequence {S1, S0} is transitioning from {0,0} to {1,1} in order to change the mux output from D0 to D3. However, due to a skew delay between the "0 to 1" transitions of S0 and S1, the input selection sequence {S1, S0} briefly takes the value {0,1} for which data input D1 is incorrectly selected. A "0" glitch appears at the output of mux 802 when the output should remain at "1" throughout the transition.

Typically, glitches of the type of glitch 804 may occur at the output of the mux whenever more than one select input changes values during an input selection transition. Accordingly, to prevent the occurrence of such glitches at the output of mux 606 of MDDI serial encoder 600, embodiments of the present invention employ a Gray code input selection sequence.

Another type of output glitch, illustrated as 806 in FIG. 8, occurs due to transitions in the data inputs of the mux. In the example of FIG. 8, in an input selection cycle, the input selection sequence {S1, S0} transitions from {0,0} to {0,1}. However, due a timing skew between the select signals S1, S0 and the data signal D0, the data signal D0 changes values before the end of its selection period. A "0" glitch appears at the output of mux 802 when the output should remain at "1" throughout the transition. To prevent such glitches at the output of mux 606 of MDDI serial encoder 600, embodiments of the present invention ensure that data inputs to the mux remain stable one clock cycle before being used. This is done by delay matching the paths from the select inputs to the output of mux.

In addition to the two types of mux output glitches illustrated in FIG. 8, yet another type of output glitch can occur at the output of a mux. This type of glitch, typically caused by a timing imbalance between internal signals within the mux itself, causes the mux to select no input during an input transition. As such, whenever the input transition is between data inputs both having the value "1", glitches of this type may be seen at the output of the mux. To prevent such glitches, the output of mux 606 of MDDI serial encoder 600 is designed such that it remains at "1" throughout any input transition between data inputs both having the value "1" at the time of the transition.

Optimized Output Selection Algorithm

Figure 9:
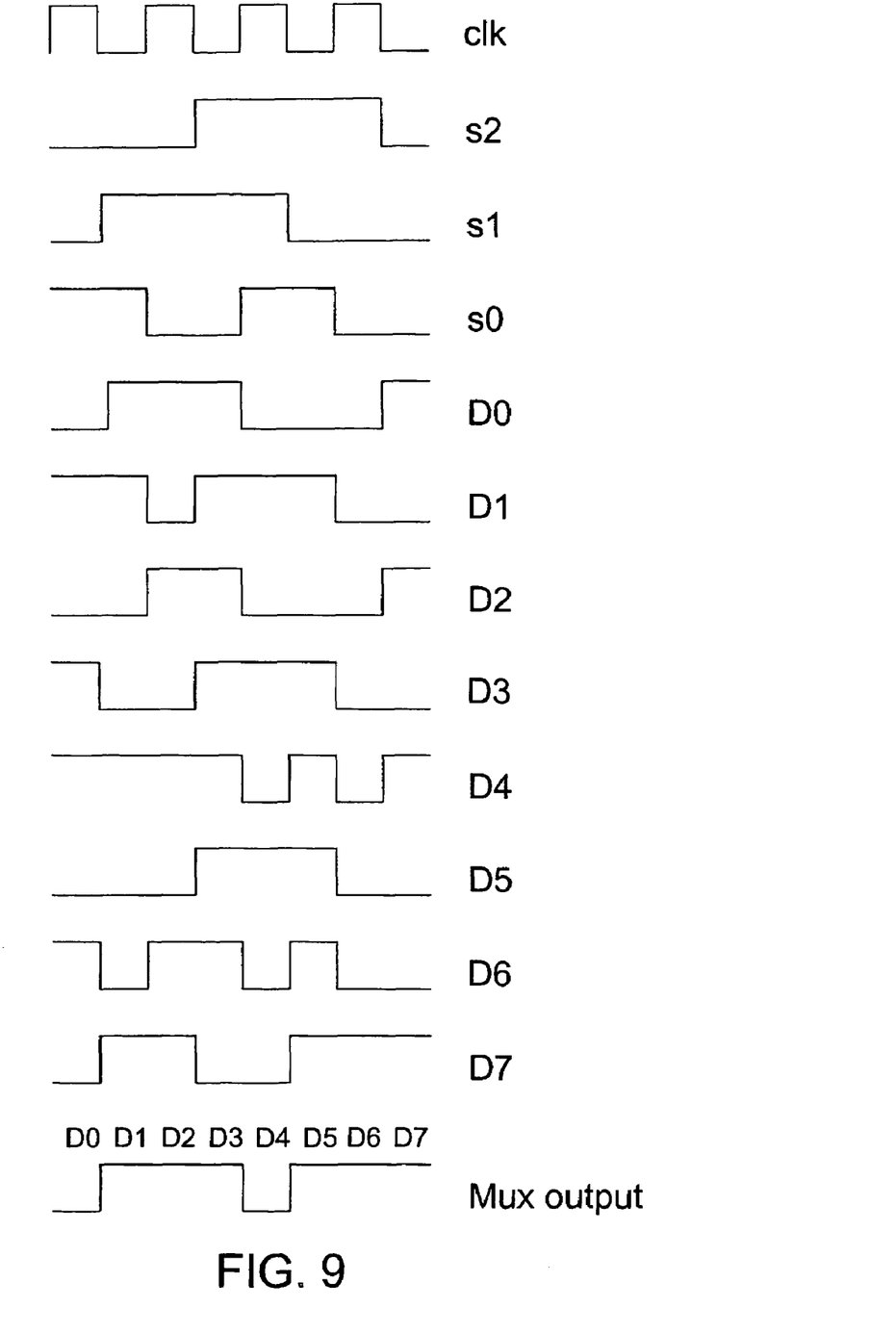
FIG. 9 is an example timing diagram relating the input clock, the select inputs, the data inputs, and the mux output of the mux of FIG. 6.

The output of mux 606 of MDDI serial encoder 600 is governed by the following output selection algorithm:

edge of the input clock and that a single select input changes at every transition. The mux output is glitch-less and outputs a data byte every 4 cycles of the input clock. Data bits D0, . . . , D7 are exemplary sequences that are used for illustrative purposes only and do not necessarily correspond to actual sequences in implementation.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

| Mux output = | (sn(2) AND sn(1) AND sn(0) AND d(0)) | OR | (sn(2) AND sn(1) AND s(0) AND d(1)) | OR |
|---|---|---|---|---|
| | (sn(2) AND s(1) AND sn(0) AND d(2)) | OR | (sn(2) AND s(1) AND s(0) AND d(3)) | OR |
| | (s(2) AND sn(1) AND sn(0) AND d(4)) | OR | (s(2) AND sn(1) AND s(0) AND d(5)) | OR |
| | (s(2) AND s(1) AND sn(0) AND d(6)) | OR | (s(2) AND s(1) AND s(0) AND d(7)) | OR |
| | (sn(2) AND sn(1) AND d(1) AND d(0)) | OR | (sn(1) AND sn(0) AND d(4) AND d(0)) | OR |
| | (sn(2) AND s(0) AND d(3) AND d(1)) | OR | (sn(2) AND s(1) AND d(3) AND d(2)) | OR |
| | (s(2) AND sn(1) AND d(5) AND d(4)) | OR | (s(1) AND sn(0) AND d(6) AND d(2)) | OR |
| | (s(2) AND s(0) AND d(7) AND d(5)) | OR | (s(2) AND s(1) AND d(7) AND d(6)); | | wherein s(n) represents the value of the n-th select input of the mux, sn(n) represents the inverse of s(n), and d(k) represents the value of the k-th data input of the mux. For example, in the case of the Gray code input selection sequence of FIG. 7, the data inputs d(0), d(1), . . . , d(7) of the above equation correspond respectively to D7, D0, D2, D1, D6, D5, D3, and D4.

As is apparent to a person skilled in the relevant art, the first eight terms of the above equation are concerned with selecting the output of the mux. The last eight terms ensure that internal mux glitches, as described above, do not appear during input transitions. Furthermore, having stable mux inputs and using a Gray code input selection sequence guarantee that the other two types of output glitches, as described above, do not occur.

The above output selection algorithm is optimized based on a priori knowledge of the input selection sequence of the mux. In other words, given an input selection sequence, the output selection algorithm is designed to provide a glitch-free mux output only for input transitions in accordance with the input selection sequence. Accordingly, the output selection algorithm is not concerned with providing a glitch-free output for input transitions not within the input selection sequence. This design choice of the present invention reduces the number of terms in the above output selection algorithm to a necessary minimum. Consequently, the physical size of the mux is also reduced.

Example Timing Diagram

FIG. 9 is an example timing diagram relating the input clock, the select inputs, the data inputs, and the mux output of mux 606. In the example of FIG. 9, the input selection sequence {S2,S1,S0} is in accordance with the Gray code input selection sequence illustrated in FIG. 7.

From FIG. 9, it can be noted that the input selection sequence {S2,S1,S0} transitions at every rising or falling

What is claimed is:

1. A double data rate serial encoder, comprising:
   a glitch-less multiplexer (mux) having a plurality of mux data inputs, a plurality of select inputs and a mux output, wherein the mux output does not glitch due to a change of any single select input bit;
   a plurality of latches, having latch data inputs and latch data outputs, wherein the latch data outputs are coupled to the plurality of mux data inputs;
   an enabler, coupled to the latches, to enable and control the latches to update the latch data outputs at a time when the latch data inputs are not changing; and
   a counter, coupled to the select inputs of the mux, to select one of the plurality of mux data inputs in a predetermined sequence for the mux output and said counter controlling the enabler wherein the counter transitions on either a rising or a falling edge of an input clock, and only a single counter state bit changes on a transition between any two consecutive states in a count sequence.

2. An encoder according to claim 1, wherein the mux is an N:1 mux having N mux data inputs and one mux output, wherein N is an integer power of 2.

3. An encoder according to claim 1, wherein the mux has eight mux data inputs.

4. An encoder according to claim 1, wherein the counter provides the mux with input selection values according to a Gray code sequence.

5. An encoder according to claim 4 wherein the mux includes an output selection algorithm optimized based on a priori knowledge of the Gray code sequence.

6. An encoder according to claim 5, wherein the output selection algorithm provides a glitch-less output only during input transitions in accordance with the Gray code sequence, thereby reducing the size of the mux.

7. An encoder according to claim 6, wherein the output selection algorithm, selects the mux output in accordance with the following: TABLE-US-00002

```
Output =  (sn(2) AND sn(1) AND sn(0) AND d(0))   OR  (sn(2) AND sn(1) AND s(0) AND d(1))  OR
          (sn(2) AND s(1) AND sn(0) AND d(2))    OR  (sn(2) AND s(1) AND s(0) AND d(3))   OR
          (s(2) AND sn(1) AND sn(0) AND d(4))    OR  (s(2) AND sn(1) AND s(0) AND d(5))   OR
          (s(2) AND s(1) AND sn(0) AND d(6))     OR  (s(2) AND s(1) AND s(0) AND d(7))    OR
          (sn(2) AND sn(1) AND d(1) AND d(0))    OR  (sn(1) AND sn(0) AND d(4) AND d(0))  OR
          (sn(2) AND s(0) AND d(3) AND d(1))     OR  (sn(2) AND s(1) AND d(3) AND d(2))   OR
          (s(2) AND sn(1) AND d(5) AND d(4))     OR  (s(1) AND sn(0) AND d(6) AND d(2))   OR
          (s(2) AND s(0) AND d(7) AND d(5))      OR  (s(2) AND s(1) AND d(7) AND d(6));
``` wherein s(n) represents a bit of an input selection value;
sn(n) represents the inverse of s(n); and
d(k) represents a bit of an input of the mux.

8. An encoder according to claim 6, wherein the counter transitions at every edge of the input clock and the mux outputs a bit at every edge of the input clock.

9. An encoder according to claim 1, wherein only a subset of the latches are updated while another subset of the latches are being selected for output by the mux.

10. An encoder according to claim 4, wherein the enabler enables the latches based on the input selection values generated by the counter.

11. An encoder according to claim 1, wherein the encoder receives a parallel input data and serially outputs it onto a serial communications link.

12. An encoder according to claim 1, wherein the serial communications link is a Mobile Display Digital Interface (MDDI) link.

13. A serial encoder, comprising:
means for storing a plurality of input bits;
means for generating an input selection sequence comprising a counter to generate the input selection in a predetermined sequence, said counter transitions on either a rising or a falling edge of an input clock, and only a single counter state bit changes on a transition between any two consecutive states in a count sequence; and
means for serially outputting said plurality of input bits according to said input selection sequence, wherein said means for serially outputting comprises a glitch-less output during input transitions in said input selection sequence.

14. A serial encoder according to claim 13, further comprising: means for updating the plurality of input bits in said storing means.

15. A serial encoder according to claim 13, wherein said input selection sequence is a Gray code sequence.

16. A serial encoder according to claim 15, wherein said means for outputting includes an output selection algorithm optimized based on a priori knowledge of the Gray code sequence.

17. A serial encoder according to claim 16, wherein the output selection algorithm provides the glitch-less output only during input transitions in accordance with the Gray code sequence.

18. A serial encoder according to claim 13, wherein said serial outputting means outputs a bit at every edge of the input clock.

19. A system, comprising:
a glitch-less multiplexer (mux) having a plurality of mux data inputs a plurality of select inputs and a mux output, wherein the mux output does not glitch due to a change of any select input bit;
a plurality of latches, having a latch data inputs and latch data outputs, wherein the latch data outputs are coupled to the plurality of mux data inputs;
an enabler, coupled to the latches, to enable and control the latches to update the latch data outputs at a time when the latch data inputs are not changing; and
a counter, coupled to the select inputs of the mux, to select one of the plurality of mux data inputs in a predetermined sequence for the mux output and said counter controlling the enabler wherein the counter transitions on either a rising or a falling edge of an input clock, and only a single counter state bit changes on a transition between any two consecutive states in a count sequence.

* * * * *